United States Patent Office

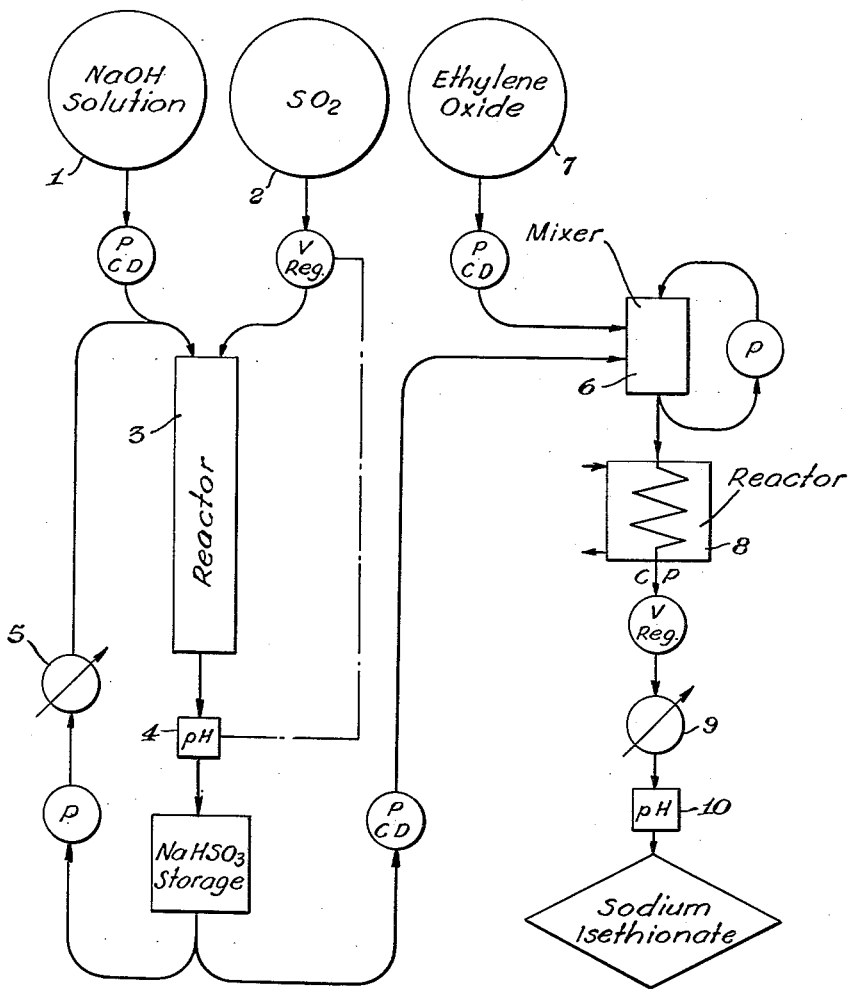

2,810,747
Patented Oct. 22, 1957

2,810,747

CONTINUOUS PRODUCTION OF SALTS OF HYDROXY ALIPHATIC SULFONIC ACIDS

Arthur R. Sexton and Edgar C. Britton, Midland, Mich., assignors to The Dow Chemical Company, Midland, Mich., a corporation of Delaware Application August 22, 1955, Serial No. 529,846

7 Claims. (Cl. 260—513)

This invention relates to the production of hydroxy aliphatic sulfonic acid salts such as sodium isethionate.

It particularly concerns an improved method for the continuous production of salts of hydroxy aliphatic sulfonic acids that are substantially free of impurities.

Sodium isethionate, i. e., the sodium salt of 2-hydroxyethanesulfonic acid, is conventionally prepared by reacting ethylene oxide with sodium bisulfite in aqueous solution according to the equation:

The product of this reaction is a water solution of sodium isethionate. However, in actual practice, the water solution of sodium isethionate contains water-soluble impurities and by-products. Among these impurities and by-products are the following:

*Sodium sulfate.*—Commercial sodium bisulfite contains appreciable quantities of sodium sulfate. In order to obtain a sulfate-free product, it is necessary to treat the sodium isethionate, e. g. with barium hydroxide and to separate the precipitated barium sulfate.

*Sodium sulfite.*—Commercial sodium bisulfite contains appreciable quantities of sodium sulfite, which is not readily separated from the product. If attempt is made to consume the sulfite by adding an excess of ethylene oxide, sodium hydroxide is produced according to the equation:

*Sodium hydroxide.*—Reaction of sodium sulfite according to the foregoing equation produces sodium hydroxide.

*Glycol and glycol ethers.*—Reaction of ethylene oxide with water and glycol produces glycol and glycol ethers according to these equations:

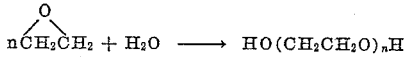

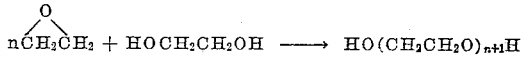

The formation of glycol and glycol ethers is increased by use of an excess of ethylene oxide relative to the sodium bisulfite. When an attempt is made to minimize the formation of glycol and glycol ether impurities by limiting the proportion of ethylene oxide to the amount theoretically required to produce sodium isethionate, the concentration of other impurities such as sodium sulfite and unreacted sodium bisulfite is caused to increase.

In many instances, impurities such as those just described are very objectionable in the sodium isethionate product. Where the sodium isethionate product is employed as a reactant in further chemical reactions, e. g. in the making of detergents, these impurities either carry through to the resulting product or enter into by-product reactions forming further impurities, thereby contaminating that product. For example, in detergents made from a sodium isethionate product containing sulfite or bisulfite salts, these impurities often give rise to foul odors of a mercaptan nature and are very objectionable. In detergents made from an isethionate product containing appreciable proportions of glycols and glycol ethers, these impurities give rise to hygroscopic and sticky products.

Most of the impurities just described are very difficult to remove from the isethionate product once formed therein. Because of the difficulty of removing impurities from the isethionate product, and because of the objections to the presence of such impurities in the product, it is necessary to produce the sodium isethionate in a form substantially free of impurities in the first instance.

An object of this invention is to provide salts of hydroxy aliphatic sulfonic acids such as sodium isethionate in a form that is substantially free of impurities.

A more particular object is to provide a continuous method for the production of such salts.

A still more specific object is to provide a continuous method for the production, from ethylene oxide, of a sodium isethionate product that is substantially free of sodium sulfate, sodium sulfite, and other impurities.

Other objects and advantages of the invention will be evident in the following description.

The objects of this invention have been attained in a method which can be illustrated by the production of sodium isethionate.

The drawing is a diagrammatic sketch showing the flow of materials through the steps of the method and showing a suitable arrangement of apparatus in which the method can be carried out.

In the embodiment represented by the drawing, streams of a sodium hydroxide aqueous solution and of pure sulfur dioxide liquid or gas are fed from sources 1 and 2, respectively, to a reactor 3, at rates that correspond to from 1.00 to 1.02 mole weights of sodium hydroxide per mole weight of sulfur dioxide. The reactor 3 is preferably a packed column, but can be any appliance adapted to contacting the feed materials and enabling their interaction. The liquid effluent from the reactor 3, or a sample stream of such effluent, is preferably passed through a pH meter 4, and the pH value of the liquid reaction product is thereby measured. At the specified rates of feed of sodium hydroxide and of sulfur dioxide to the reactor, the liquid effluent from reactor 3 at all times has a degree of acidity corresponding to pH values between 4.30 and 4.35 as measured with a glass electrode at a temperature of 25° C. (Whenever reference is made herein to pH values, it will be understood that such values are determined by means of the glass electrode at a temperature of 25° C.) Usually, the rate of flow of sodium hydroxide solution into reactor 3 is maintained substantially constant, and the rate of flow of sulfur dioxide into reactor 3 is adjusted by a regulating valve in the feed conduit in response to impulses from the pH meter 4. Other devices can be employed to control these flow rates provided that the relative rates of feed of sodium hydroxide and of sulfur dioxide are within the range as specified. Such control insures that the sodium hydroxide and sulfur dioxide are fed in almost precisely stoichiometric proportions, without ever having an excess of sulfur dioxide relative to the sodium hydroxide, and with any excess of sodium hydroxide relative to the sulfur dioxide being small. Such control also insures that the sodium bisulfite product solution contains no free sulfur dioxide (sulfurous acid) and very little sodium sulfite.

The concentration of sodium hydroxide in the aqueous feed solution is not critical, except that at least enough water should be contained therein that the sodium bisulfite product is held in solution. Usually, solutions having from 10 to 20 percent by weight of sodium hydroxide are employed, although more or less concentrated solutions can be used.

Since the reaction occurring in reactor 3 is exothermic, cooling is necessary, and is preferably carried out by circulating a stream of the effluent sodium bisulfite solution from the reactor 3 through a cooling device 5 and returning the cooled solution to the reactor 3. Such procedure is further advantageous in that the circulating aqueous solution serves to diulte and to react with the sodium hydroxide feed stream, thereby moderating the vigor of the reaction thereof with sulfur dioxide. In this manner the reaction is effectively divided into steps. In one step, the sodium hydroxide in the feed stream interacts with a part of the sodium bisulfite in the circulating liquor according to the equation $$NaOH + NaHSO_3 \rightarrow Na_2SO_3 + H_2O$$

In the column itself, the sulfur dioxide feed reacts with the sodium sulfite according to the equation, $$Na_2SO_3 + SO_2 + H_2O \rightarrow 2NaHSO_3$$

In the operation described above and illustrated by the drawing, the temperature at the outlet of the reactor 3, i. e. the temperature of the effluent sodium bisulfite solution, should not be allowed to exceed 50° C., and should preferably be about 30° C. Ordinary cooling water in cooler 5 usually suffices to lower the temperature of the circulating stream to from 15° to 20° C. If the rate of circulation of the sulfite solution is such that the temperature rise upon admixture and reaction therewith of the sodium hydroxide is about 10° C., then the temperature rise upon admixing and reaction of the sulfur dioxide in reactor 3 will be only about 5° C.

The procedure described is further advantageous in that the volume of liquor flowing through reactor 3 is greatly increased, whereby change in the rate of feed of the reactants is more quickly detected by the pH meter 4.

A stream of the resulting sodium bisulfite aqueous solution, containing no sodium sulfate, no sulfurous acid, and very little sodium sulfite, and having a pH value between 4.30 and 4.35, is fed at a substantially constant rate to a mixing and reaction zone, together with a stream of ethylene oxide from source 7 at a substantially constant rate corresponding to from 1.06 to 1.08 mole weights of ethylene oxide per mole weight of sodium bisulfite fed, i. e. from 6 to 8 percent excess ethylene oxide based on theory according to the equation $$NaHSO_3 + \overset{O}{\overset{\diagup\diagdown}{CH_2CH_2}} \longrightarrow HOCH_2CH_2SO_3Na$$

In order to accomplish the objects of this invention, it is essential that the proportion of ethylene oxide relative to sodium bisulfite fed to the reaction mixture be within the precise range specified. If appreciably less than 1.06 moles of ethylene oxide per mole of bisulfite be employed, the resulting sodium isethionate product contains objectionable proportions of salts of sulfurous acid, e. g. sodium bisulfite and/or sodium sulfite. If appreciably more than 1.08 moles of ethylene oxide per mole of bisulfite be employed, the resulting sodium isethionate product contains objectionable proportions of glycol and glycol ethers. When ethylene oxide is employed in the proportion of from 1.06 to 1.08 mole weights per mole weight of bisulfite according to this invention, the resulting sodium isethionate product is substantially free of sodium bisulfite and without appreciable proportions of glycol and glycol ethers.

The reaction mixture of sodium bisulfite and ethylene oxide in the proportions specified is brought to a reaction temperature, preferably between about 60° and about 180° C., while maintaining a pressure at least sufficient to keep the reaction mixture in a liquid state. These conditions are maintained for a time at least sufficient substantially to complete the reaction. While the actual minimum average necessary contact time in the reaction zone will vary with the temperature and the particular apparatus, the following can be used as a guide:

| Reaction temperature: | Contact time, minutes, approx. |
|---|---|
| 60° C | 45 |
| 75° C | 30 |
| 100° C | 15 |
| 130° C | 10 |
| 180° C | 6 |

The mixing and interaction of the bisulfite and ethylene oxide starting materials can be carried out in the same zone, e. g. in a reaction vessel. However, it is often advantageous to provide means especially designed for mixing the reactants to form a reaction mixture, and separate means for effecting interaction of the reactants in that reaction mixture. The drawing shows a mixer 6 into which streams of the bisulfite salt solution and of the ethylene are fed. The mixer 6 is for the purpose of intimately admixing the starting materials.

The drawing shows a circuit for pumping a stream of liquid aqueous solution through the mixer 6. This is a convenient means for effecting thorough mixing of the feed materials, but other effective mixing devices can be employed in its stead.

Interaction of the reactants may take place in mixer 6 to an extent dependent upon the temperature and time of residence of the mixture in the mixer. At the temperatures usually encountered in the mixer, e. g., from room temperature to about 50° C., the reaction is sluggish. In the arrangement shown in the drawing, the reaction mixture prepared in mixer 6 is passed as a continuous stream through a finishing reactor 8 wherein the reaction mixture is brought to a temperature at which rapid and substantially complete reaction takes place. The drawing shows reactor 8 as a coiled tube surrounded by a jacket through which a heat-transfer fluid such as steam or water is passed. Other forms of reactors may be substituted. The reaction mixture in reactor 8 is brought to a reaction temperature, preferably between 60° and 180° C., while maintaining a pressure at least sufficient to keep the reaction mixture in a liquid state, for a time sufficient to complete the reaction as hereinbefore described.

The liquid effluent stream from reactor 8 is taken through a constant pressure regulating valve, and cooled in cooler 9. The cooled stream, or a sample portion thereof, is taken to a pH meter 10 where the pH value of the product solution is measured. When the operations have been carried out in the manner hereinbefore specified, the pH value of the product solution is in the order of from 10 to 11.5. If appreciably less than 1.06 mole weights of ethylene oxide be fed per mole weight of sodium bisulfite, the pH value of the product solution will be less than 10, e. g. from 5 to 6, and the product will contain unreacted sodium bisulfite in objectionable proportion. Therefore, pH values below about 10 in the product solution call for an increase in the feed rate of ethylene oxide relative to the bisulfite. However, the pH value of the product solution does not directly reveal a condition where the feed rate of ethylene oxide is greater than that specified, i. e. more than 1.08 mole weights of ethylene oxide per mole weight of bisulfite. In practice, the operator of this process, wherein the pH value of the product solution is between 10 and 11.5, makes an occasional test by at least momentarily decreasing slightly the rate of feed of ethylene oxide. If the feed rate of ethylene oxide is within the required, specified range, such momentary decrease in feed rate will result in an observable decrease in the pH value of the product solution. In other words, the feed of ethylene oxide is maintained at the minimum rate for which the pH value of the product solution is at least 10.

The resulting product is an aqueous solution of sodium isethionate that is substantially free of inorganic salt impurities and without appreciable proportions of glycol and glycol ethers. The solution can be employed as such, or the sodium isethionate contained therein can be recovered in anhydrous form by evaporation of water from the solution.

In order to obtain a product that is free of sulfate salts, it is necessary to employ starting materials that are free of sulfates and materials capable of forming sulfates. To this end also, it is important that oxygen be excluded from contact with the reactants, especially the bisulfite-containing solutions. For this reason it is advantageous to displace air from the apparatus with an inert gas such as nitrogen. In order to minimize the contamination of the product with metal impurities, it is desirable to carry out the operations in equipment constructed of corrosion-resistant materials, such as stainless steel.

The following example illustrates the preparation of sodium isethionate in accordance with this invention, but should not be construed as limiting its scope. In the example further reference is made to the drawing. Air was displaced from the apparatus by purging with nitrogen, and contact of the reactants with oxygen was prevented during operation of the process. Parts of the apparatus that were contacted with bisulfite-containing materials were constructed of stainless steel.

An aqueous solution containing 17.5 percent by weight of sodium hydroxide was fed at a substantially constant average rate of 9.1 gallons per hour to the top of a 4-inch diameter, 6-foot long absorption tower (reactor 3) packed with ¾ inch saddles. Sulfur dioxide, free of sulfur trioxide and oxygen, was vaporized and fed to the absorption tower at an average rate of about 25.3 pounds per hour through a regulating valve. The feed of sulfur dioxide was controlled in response to the pH value measured on the liquid effluent from the absorption tower so as to maintain that pH value in the range from 4.30 to 4.35, whereby the rates of feed of the starting materials were maintained at from 1.00 to 1.02 pound moles of sodium hydroxide per pound mole of sulfur dioxide. The effluent from the absorption tower contained about 34 percent by weight sodium bisulfite and was taken into a temporary storage or holding tank. The temperature of the bisulfite solutions was about 30° C. From the holding tank a stream of the aqueous solution was pumped at an average rate of 74 gallons per hour through a cooling device 5, cooled to a temperature about 17° C., and passed to the top of the absorption tower. The feed stream of sodium hydroxide was admixed with the cold stream of sodium bisulfite solution prior to its entering the absorption tower, the admixing and reaction thereby causing a rise of temperature to about 25° C. In the absorption tower, reaction of the sulfur dioxide with the aqueous solution caused a further temperature rise to about 30° C. at the effluent.

Another portion of the sodium bisulfite solution from the holding tank was pumped at a substantially constant average rate of 11.1 gallons per hour to a mixing tank (mixer 6). Into the mixing tank there was also fed a stream of liquid ethylene oxide at an average rate of 18 pounds per hour. The rate of flow of ethylene oxide corresponded to from 1.06 to 1.08 pound-moles of ethylene oxide per pound-mole of sodium bisulfite fed.

The rate of flow of ethylene oxide was occasionally adjusted slightly in order that the pH value of the reaction product was maintained between 10 and 11.5. The liquid contents of the mixing tank were circulated vigorously by means of an external pump, thereby effecting intimate mixing of the reactants and formation of a homogeneous aqueous solution, the temperature of which was about 35° C.

The aqueous solution formed in the mixer 6 passed to a tubular reactor 8 at an average rate of about 12.9 gallons per hour. The coil in reactor 8 contained 42 feet of 1¼ inch tubing and was surrounded by a jacket and heated by steam at a temperature of 100° C. The reaction mixture was released from the coil through a regulating valve that maintained a pressure of 100 p. s. i. g. in the coil. The effluent product solution was cooled in cooler 9 and was taken to product storage receivers. The pH value of the effluent product solution was determined and was maintained between 10 and 11.5 by control of the rate of feed of the ethylene oxide.

Analysis of the product solution was as follows, percent by weight:

|   | Percent |
|---|---|
| Sodium isethionate | 41 |
| Sodium sulfite | Less than 0.005 |
| Alkalinity as NaOH | Less than 0.2 |
| Sodium sulfate | Less than 0.01 |

Methods available for the direct determination of glycol and glycol ethers in this solution are inexact. A portion of the solution was evaporated to dryness. The dry salt was colorless, free-flowing, and non-hydroscopic. The proportion of glycol and glycol ethers, if any, contained therein was judged non-objectionable.

In place of sodium hydroxide there can be used any alkali whose sulfite and bisulfite salts are water-soluble. Suitable alkalies include metal hydroxides, especially alkali metal hydroxides such as potassium hydroxide, lithium hydroxide, rubidium hydroxide and caesium hydroxide, ammonium hydroxide, and organic amines such as triethanolamine and triisopropanol amine. In the preparation of bisulfite salt solutions, the proportion of alkali relative to sulfur dioxide should be from 1.00 to 1.02 equivalent weights of the alkali per mole weight of the sulfur dioxide, i. e., from 100 to 102 percent of theory according to the equation:

$$X-(OH)_n + nSO_2 \rightarrow (HSO_3)_n$$

wherein $X-(OH)_n$ represents a water-soluble alkali, $X(HSO_3)_n$ represents a water-soluble bisulfite salt, X represents a metal ion, ammonium ion, or amine ion, and $n$ is a small integer representing the cation valence.

In place of ethylene oxide there can be used other epoxy aliphatic compounds wherein the epoxy oxygen atom is a bridge between adjacent carbon atoms in a carbon chain of the molecule and where the epoxy group is the only substituent chemically reactive under the reaction conditions employed in this process. Examples of such compounds are epoxy alkanes, especially olefin oxides having from 2 to 4 carbon atoms, and epoxy alkanes substituted by halo, hydroxyl, alkoxyl, and like radicals, such as propylene oxide (1,2-epoxypropane), butylene oxide (1,2-and/or 2,3-epoxybutane), isobutylene oxide (1,2-epoxy-2-methylpropane), epibromohydrin (3-bromo-1,2-epoxypropane), epichlorohydrin (3-chloro-1,2-epoxypropane), glycidol (2,3-epoxy-1-propanol), 1-bromo-2,3-epoxybutane, 1-chloro-2,3-epoxybutane, 3-bromo-1,2-epoxybutane, 3 - chloro - 1,2-epoxybutane, 1-chloro-2,3-epoxy-2-methylpropane, 1-chloro-2-(chloromethyl)-2,3-epoxypropane, and 1,2-epoxy-3-methoxypropane.

In place of sodium isethionate, the method can be applied to the making of other salts of hydroxy aliphatic sulfonic acids, examples of which are as follows:

Potassium isethionate, from ethylene oxide and potassium bisulfite, the latter from potassium hydroxide and sulfur dioxide;

Sodium 1-(or 2-)hydroxy-2-(or 1-)propanesulfonate, from propylene oxide and sodium bisulfite;

Ammonium 1-(or 2-)hydroxy-2-(or 1-)butanesulfonate, from 1,2-epoxybutane and ammonium bisulfite, the latter from ammonia (ammonium hydroxide) and sulfur dioxide;

The triethanolamine salt of 2-hydroxy-3-butane-sulfonic acid, from 2,3-epoxybutane and triethanolamine bisulfite, the latter from triethanol amine and sulfur dioxide; and Potassium 1-(or 2-)hydroxy-2-methyl-2-(or 1-)propanesulfonate, from isobutylene oxide and potassium bisulfite. It may be pointed out that the opening of an unsymmetrical epoxide ring can give rise to either or both of two isomeric hydroxy aliphatic sulfonates and that the normal reaction product can be a mixture of the corresponding isomers.

We claim:

1. A method for the continuous production of salts of hydroxy aliphatic sulfonic acids that are substantially free of sulfate and sulfite salts and without appreciable proportions of glycols and glycol ethers, which method comprises admixing and interacting sulfur dioxide and a water solution of an alkali whose bisulfite salt is appreciably soluble in water in the proportions of one mole weight of sulfur dioxide and from 1.00 to 1.02 chemical equivalent weights of alkali to obtain a water solution of an alkali bisulfite salt, continuously feeding to a mixing and reaction zone a stream of such alkali bisulfite salt solution and a stream of an epoxy aliphatic compound wherein the epoxy oxygen atom is a bridge between adjacent carbon atoms in a carbon chain of the molecule, wherein the carbon chain has from 2 to 4 carbon atoms and wherein the epoxy group is the only substituent chemically reactive with the alkali bisulfite salt, the relative rates of feeding the alkali bisulfite salt solution and the epoxy aliphatic compound being such as correspond to from 1.06 to 1.08 mole weights of epoxy aliphatic compound per mole weight of alkali bisulfite salt, intimately admixing the alkali bisulfite salt solution and the epoxy aliphatic compound, bringing the resulting mixture to a reaction temperature between about 60° and about 180° C. at a pressure at least sufficient to maintain the reaction mixture in the liquid state and for a time to obtain substantially complete interaction of the alkali bisulfite salt and the epoxy aliphatic compound, substantially excluding molecular oxygen from the reaction mixture while carrying out the foregoing operations, and continuously withdrawing from the reaction zone a water solution of a salt of a hydroxy aliphatic sulfonic acid that is substantially free of sulfate and sulfite salts and without appreciable proportions of glycols and glycol ethers.

2. A method according to claim 1 wherein the epoxy aliphatic compound is an olefin oxide having from 2 to 4 carbon atoms.

3. A method according to claim 1 wherein the epoxy aliphatic compound is ethylene oxide.

4. A method according to claim 1 wherein the alkali is an alkali metal hydroxide.

5. A method according to claim 1 wherein the alkali is sodium hydroxide.

6. A method for the continuous production of sodium isethionate that is substantially free of sodium sulfate, sodium sulfite, and without appreciable proportions of glycol and glycol ethers, which method comprises admixing and interacting sulfur dioxide and a water solution of solium hydroxide, in the proportions of one mole weight of sulfur dioxide and from 1.00 to 1.02 mole weights of sodium hydroxide, to obtain a water solution of sodium bisulfite having a pH value between 4.30 and 4.35 when measured at 25° C. with a glass electrode, continuously feeding a stream of such sodium bisulfite solution and a stream of ethylene oxide to a mixing and reaction zone, the rates of feed of the sodium bisulfite solution and of the ethylene oxide being such as correspond to from 1.06 to 1.08 mole weights of ethylene oxide per mole weight of sodium bisulfite, effecting intimate admixing to form a solution, bringing the resulting solution to a reaction temperature between 60° and 180° C. at a pressure at least sufficient to maintain the reaction mixture in the liquid state and for a time to obtain substantially complete interaction of the sodium bisulfite and the ethylene oxide, substantially excluding molecular oxygen from the reaction mixture while carrying out the foregoing operations, and continuously withdrawing from the reaction zone a water solution of sodium isethionate having a pH value between 10 and 11.5 and that is substantially free of sodium sulfate and sodium sulfite, and without appreciable proportions of glycol and glycol ethers.

7. A method according to claim 6 wherein the concentration of sodium hydroxide in the water solution of sodium hydroxide is between 10 and 20 percent by weight, and the solution of sodium bisulfite and ethylene oxide is held in the reaction zone at a temperature of about 100° C. for about 15 minutes.

References Cited in the file of this patent

UNITED STATES PATENTS 2,653,970 Fessler _____ Sept. 29, 1953

OTHER REFERENCES

Rumpf: Chem. Abst. 32: 6622, 1938.
Groggins: Unit Processes in Organic Synthesis (4th ed.), p. 294, 1952.